US012634695B2

(12) United States Patent
Duo et al.

(10) Patent No.: US 12,634,695 B2
(45) Date of Patent: May 19, 2026

(54) SECURING TRANSMISSION PATHS IN A MESH NETWORK

(71) Applicant: SonicWALL Inc., Milpitas, CA (US)

(72) Inventors: Zhuangzhi Duo, Fremont, CA (US); Atul Dhablania, San Jose, CA (US)

(73) Assignee: SONICWALL INC., Milpitas, CA (US)

( * ) Notice: Subject to any disclaimer, the term of this patent is extended or adjusted under 35 U.S.C. 154(b) by 85 days.

(21) Appl. No.: 18/816,879

(22) Filed: Aug. 27, 2024

(65) Prior Publication Data

US 2024/0422543 A1     Dec. 19, 2024

Related U.S. Application Data

(63) Continuation of application No. 16/911,111, filed on Jun. 24, 2020, now Pat. No. 12,075,246, which is a (Continued)

(51) Int. Cl.
  *H04W 12/08*      (2021.01)
  *H04W 4/80*       (2018.01)
  (Continued)

(52) U.S. Cl.
  CPC ............. *H04W 12/08* (2013.01); *H04W 4/80* (2018.02); *H04W 12/009* (2019.01); (Continued)

(58) Field of Classification Search
  None
  See application file for complete search history.

(56) References Cited

U.S. PATENT DOCUMENTS 7,215,926 B2    5/2007  Corbett et al.
7,576,646 B2    8/2009  Hayden et al.
          (Continued)

FOREIGN PATENT DOCUMENTS

CA        2978928       3/2018
CN      101807998       8/2010
          (Continued)

OTHER PUBLICATIONS

U.S. Appl. No. 16/397,935 Office Action mailed Jul. 2, 2020.
          (Continued)

*Primary Examiner* — Ali H. Cheema
(74) *Attorney, Agent, or Firm* — Patent Capital Group

(57) ABSTRACT

The present disclosure relates to securely setting up mesh networks in a secure manner that does not require a physical network cable being attached to a wireless device and that do not require transmitting unencrypted information wirelessly when a mesh network is setup. Methods and apparatus consistent with the present disclosure may use different communication interfaces and different types of channels to ensure that devices included in or being added to a wireless mesh network always communicate securely. Methods and apparatus consistent with the present disclosure may use a combination of conventional secure communication methods, such as secure hypertext transfer protocol (HTTPS) communications, low power signals that travel over short distances, and other types of communications to create a system that only uses secure communications when setting up or expanding a wireless mesh network.

20 Claims, 6 Drawing Sheets

Related U.S. Application Data continuation-in-part of application No. 16/404,655, filed on May 6, 2019, now Pat. No. 12,022,295, which is a continuation-in-part of application No. 16/397,935, filed on Apr. 29, 2019, now Pat. No. 10,972,916.

(60) Provisional application No. 62/942,811, filed on Dec. 3, 2019.

(51) Int. Cl.
| | |
|---|---|
| *H04W 12/00* | (2021.01) |
| *H04L 9/40* | (2022.01) |
| *H04W 12/06* | (2021.01) |
| *H04W 84/18* | (2009.01) |

(52) U.S. Cl.
CPC ............. *H04L 63/18* (2013.01); *H04W 12/06* (2013.01); *H04W 84/18* (2013.01)

(56) References Cited

U.S. PATENT DOCUMENTS

| | | | | |
|---|---|---|---|---|
| 8,189,608 | B2 | 5/2012 | Duo et al. | |
| 9,071,416 | B2 | 6/2015 | Liu et al. | |
| 9,407,624 | B1 | 8/2016 | Myers et al. | |
| 9,521,145 | B2 | 12/2016 | Bhatt et al. | |
| 9,807,621 | B1 | 10/2017 | Hui et al. | |
| 9,955,526 | B1 | 4/2018 | Yu | |
| 10,057,227 | B1 | 8/2018 | Hess et al. | |
| 10,142,122 | B1 | 11/2018 | Hill | |
| 10,348,767 | B1* | 7/2019 | Lee | H04L 63/1416 |
| 10,382,203 | B1 | 8/2019 | Loladia et al. | |
| 10,397,013 | B1 | 8/2019 | Hill et al. | |
| 10,506,436 | B1 | 12/2019 | Newman et al. | |
| 10,531,299 | B1 | 1/2020 | Osborn | |
| 10,726,689 | B1* | 7/2020 | Probin | G08B 13/1672 |
| 10,764,128 | B2 | 9/2020 | Kozura et al. | |
| 10,972,916 | B2 | 4/2021 | Duo | |
| 11,128,612 | B1 | 9/2021 | Loladia | |
| 11,405,789 | B1 | 8/2022 | Wei | |
| 11,638,149 | B2 | 4/2023 | Duo et al. | |
| 11,997,635 | B2 | 5/2024 | Duo et al. | |
| 12,022,295 | B2 | 6/2024 | Duo | |
| 12,075,246 | B2 | 8/2024 | Duo | |
| 12,279,115 | B2 | 4/2025 | Duo et al. | |
| 12,376,062 | B2 | 7/2025 | Duo et al. | |
| 2004/0243840 | A1 | 12/2004 | Tran | |
| 2004/0266449 | A1 | 12/2004 | Smetters et al. | |
| 2006/0010199 | A1 | 1/2006 | Brailean et al. | |
| 2006/0245373 | A1 | 11/2006 | Bajic | |
| 2007/0070943 | A1 | 3/2007 | Livet et al. | |
| 2007/0275701 | A1 | 11/2007 | Jonker | |
| 2008/0063204 | A1 | 3/2008 | Braskich et al. | |
| 2008/0101291 | A1 | 5/2008 | Jiang et al. | |
| 2009/0077601 | A1 | 3/2009 | Brailean et al. | |
| 2009/0307343 | A1 | 12/2009 | Kumagai | |
| 2010/0066839 | A1 | 3/2010 | Azuma et al. | |
| 2010/0122330 | A1 | 5/2010 | McMillan et al. | |
| 2010/0151821 | A1* | 6/2010 | Sweeney | H04W 4/02 455/410 |
| 2010/0188990 | A1* | 7/2010 | Raleigh | H04L 67/306 709/224 |
| 2010/0188992 | A1* | 7/2010 | Raleigh | H04W 28/0215 370/254 |
| 2010/0190470 | A1* | 7/2010 | Raleigh | H04W 4/20 455/406 |
| 2010/0217881 | A1 | 8/2010 | Iino | |
| 2010/0309781 | A1 | 12/2010 | Wang et al. | |
| 2011/0055558 | A1 | 3/2011 | Liu et al. | |
| 2011/0138183 | A1 | 6/2011 | Reddy et al. | |
| 2011/0211511 | A1 | 9/2011 | Bakthavathsalu et al. | |
| 2012/0134291 | A1* | 5/2012 | Raleigh | H04W 12/37 370/252 |
| 2012/0190341 | A1 | 7/2012 | Gupta et al. | |
| 2012/0222099 | A1 | 8/2012 | Narendra et al. | |
| 2012/0257536 | A1 | 10/2012 | Kholaif et al. | |
| 2013/0152169 | A1 | 6/2013 | Stuntebeck | |
| 2013/0167196 | A1 | 6/2013 | Spencer et al. | |
| 2013/0262873 | A1 | 10/2013 | Read et al. | |
| 2013/0318343 | A1 | 11/2013 | Bjarnason et al. | |
| 2014/0040618 | A1 | 2/2014 | Liu et al. | |
| 2014/0071837 | A1 | 3/2014 | Werb et al. | |
| 2014/0098671 | A1* | 4/2014 | Raleigh | G06Q 40/12 370/235 |
| 2014/0115673 | A1 | 4/2014 | Haynes et al. | |
| 2014/0128057 | A1 | 5/2014 | Siomina et al. | |
| 2014/0185457 | A1 | 7/2014 | Barnes et al. | |
| 2014/0274056 | A1 | 9/2014 | Hyde et al. | |
| 2015/0065093 | A1 | 3/2015 | Schmidt | |
| 2015/0180842 | A1 | 6/2015 | Panther | |
| 2015/0244706 | A1 | 8/2015 | Grajek et al. | |
| 2015/0372875 | A1 | 12/2015 | Turon et al. | |
| 2015/0372876 | A1 | 12/2015 | Turon et al. | |
| 2015/0373691 | A1 | 12/2015 | Turon et al. | |
| 2015/0373750 | A1 | 12/2015 | Turon et al. | |
| 2015/0373751 | A1 | 12/2015 | Turon et al. | |
| 2015/0373752 | A1 | 12/2015 | Turon et al. | |
| 2015/0373753 | A1 | 12/2015 | Turon et al. | |
| 2016/0029290 | A1 | 1/2016 | Turon et al. | |
| 2016/0037573 | A1 | 2/2016 | Ko et al. | |
| 2016/0073252 | A1 | 3/2016 | Spencer et al. | |
| 2016/0087957 | A1 | 3/2016 | Shah et al. | |
| 2016/0095153 | A1 | 3/2016 | Chechani et al. | |
| 2016/0105424 | A1 | 4/2016 | Logue et al. | |
| 2016/0112374 | A1* | 4/2016 | Branca | H04L 63/102 726/1 |
| 2016/0134932 | A1 | 5/2016 | Karp et al. | |
| 2016/0147506 | A1 | 5/2016 | Britt et al. | |
| 2016/0182459 | A1 | 6/2016 | Britt et al. | |
| 2016/0219039 | A1 | 7/2016 | Houthooft et al. | |
| 2016/0294828 | A1 | 10/2016 | Zakaria | |
| 2016/0295364 | A1 | 10/2016 | Zakaria | |
| 2016/0349127 | A1 | 12/2016 | Britt | |
| 2016/0352729 | A1 | 12/2016 | Malik | |
| 2017/0006528 | A1 | 1/2017 | Bari | |
| 2017/0006643 | A1 | 1/2017 | Zakaria et al. | |
| 2017/0034692 | A1 | 2/2017 | Spencer et al. | |
| 2017/0048280 | A1 | 2/2017 | Logue et al. | |
| 2017/0078922 | A1* | 3/2017 | Raleigh | H04L 69/18 |
| 2017/0169640 | A1 | 6/2017 | Britt | |
| 2017/0171200 | A1 | 6/2017 | Bao | |
| 2017/0171747 | A1 | 6/2017 | Britt et al. | |
| 2017/0195136 | A1 | 7/2017 | Ghosh et al. | |
| 2017/0245145 | A1 | 8/2017 | Choi et al. | |
| 2017/0346836 | A1 | 11/2017 | Holland et al. | |
| 2017/0347264 | A1 | 11/2017 | Holland et al. | |
| 2017/0359417 | A1 | 12/2017 | Chen et al. | |
| 2018/0007140 | A1 | 1/2018 | Brickell et al. | |
| 2018/0019929 | A1 | 1/2018 | Chen et al. | |
| 2018/0063714 | A1 | 3/2018 | Stephenson | |
| 2018/0091506 | A1 | 3/2018 | Chow et al. | |
| 2018/0102032 | A1 | 4/2018 | Emmanuel et al. | |
| 2018/0124039 | A1 | 5/2018 | Grajek et al. | |
| 2018/0159855 | A1 | 6/2018 | Ha et al. | |
| 2018/0189507 | A1 | 7/2018 | Wakai | |
| 2018/0262497 | A1 | 9/2018 | Raje et al. | |
| 2018/0270904 | A1 | 9/2018 | Swengler | |
| 2018/0293367 | A1 | 10/2018 | Urman | |
| 2018/0314808 | A1 | 11/2018 | Casey et al. | |
| 2018/0316670 | A1 | 11/2018 | Brown | |
| 2018/0317266 | A1 | 11/2018 | Britt et al. | |
| 2018/0367843 | A1 | 12/2018 | Hardison et al. | |
| 2019/0028467 | A1 | 1/2019 | Oberheide et al. | |
| 2019/0028988 | A1 | 1/2019 | Yao et al. | |
| 2019/0037613 | A1 | 1/2019 | Anantharaman et al. | |
| 2019/0087568 | A1 | 3/2019 | Kim et al. | |
| 2019/0089806 | A1 | 3/2019 | Desphande | |
| 2019/0109713 | A1 | 4/2019 | Clark et al. | |
| 2019/0132303 | A1 | 5/2019 | Kurian | |
| 2019/0141655 | A1 | 5/2019 | Stricklen | |
| 2019/0150134 | A1 | 5/2019 | Kakinada et al. | |
| 2019/0173955 | A1* | 6/2019 | Bachar | H04L 63/102 |
| 2019/0182243 | A1 | 6/2019 | Tjahjono et al. | |
| 2019/0182666 | A1 | 6/2019 | Kotay | |

(56) References Cited

U.S. PATENT DOCUMENTS

| | | | | |
|---|---|---|---|---|
| 2019/0190848 A1* | 6/2019 | Zavesky | | H04L 47/821 |
| 2019/0238539 A1 | 8/2019 | Arora et al. | | |
| 2019/0245713 A1 | 8/2019 | Lo et al. | | |
| 2019/0253243 A1 | 8/2019 | Zimmerman et al. | | |
| 2019/0253893 A1 | 8/2019 | Hodroj | | |
| 2019/0259260 A1 | 8/2019 | Amini et al. | | |
| 2019/0281053 A1 | 9/2019 | Brown et al. | | |
| 2019/0350021 A1 | 11/2019 | Blum | | |
| 2019/0357023 A1 | 11/2019 | Park | | |
| 2019/0364034 A1 | 11/2019 | Alexander | | |
| 2019/0386981 A1 | 12/2019 | Ramesh Kumar et al. | | |
| 2020/0007607 A1 | 1/2020 | Maxilom et al. | | |
| 2020/0015319 A1 | 1/2020 | Chen et al. | | |
| 2020/0044851 A1 | 2/2020 | Everson et al. | | |
| 2020/0068483 A1 | 2/2020 | Likar et al. | | |
| 2020/0092701 A1 | 3/2020 | Arnberg et al. | | |
| 2020/0099896 A1 | 3/2020 | Galvin et al. | | |
| 2020/0154448 A1 | 5/2020 | Wilmunder | | |
| 2020/0169460 A1 | 5/2020 | Bartlett et al. | | |
| 2020/0169549 A1 | 5/2020 | Smith | | |
| 2020/0186998 A1 | 6/2020 | Smith et al. | | |
| 2020/0304372 A1 | 9/2020 | Henry et al. | | |
| 2020/0328913 A1* | 10/2020 | Wyas | | G06F 9/546 |
| 2020/0336476 A1 | 10/2020 | Polese Cossio et al. | | |
| 2020/0336513 A1* | 10/2020 | Martin | | H04L 63/205 |
| 2020/0344599 A1 | 10/2020 | Duo | | |
| 2020/0344608 A1 | 10/2020 | Duo | | |
| 2020/0359349 A1 | 11/2020 | Duo | | |
| 2020/0396613 A1 | 12/2020 | Duo | | |
| 2020/0412733 A1 | 12/2020 | Leon | | |
| 2021/0056179 A1 | 2/2021 | Hiratsuka | | |
| 2021/0068198 A1 | 3/2021 | Michielsen et al. | | |
| 2021/0227391 A1 | 7/2021 | Duo | | |
| 2021/0400758 A1 | 12/2021 | Kao et al. | | |
| 2022/0046397 A1 | 2/2022 | Collins | | |
| 2023/0362645 A1 | 11/2023 | Duo et al. | | |
| 2024/0323889 A1 | 9/2024 | Duo | | |
| 2024/0349058 A1 | 10/2024 | Duo | | |

FOREIGN PATENT DOCUMENTS

| | | | | |
|---|---|---|---|---|
| CN | 101431519 | | 6/2011 | |
| CN | 102177707 A * | | 9/2011 | H04N 21/4112 |
| CN | 102804200 | | 11/2012 | |
| CN | 102804201 | | 11/2012 | |
| CN | 103888941 | | 6/2014 | |
| CN | 104365122 | | 2/2015 | |
| CN | 105207987 | | 12/2015 | |
| CN | 106100848 | | 11/2016 | |
| CN | 106470207 A * | | 3/2017 | H04W 12/50 |
| CN | 107113326 | | 8/2017 | |
| CN | 108029069 | | 5/2018 | |
| CN | 109379770 | | 2/2019 | |
| CN | 109787825 | | 5/2019 | |
| CN | 107204972 | | 5/2020 | |
| CN | 108694306 | | 3/2024 | |
| JP | 2011055379 A * | | 3/2011 | |
| JP | 2016072716 | | 5/2016 | |
| JP | 6848426 B2 * | | 3/2021 | H04W 48/02 |
| KR | 20070082209 | | 8/2007 | |
| KR | 2016-0091624 | | 8/2016 | |
| KR | 2018-0094985 | | 8/2018 | |
| KR | 20190105776 | | 9/2019 | |
| TW | 201743625 | | 12/2017 | |
| TW | 201810099 | | 3/2018 | |
| WO | WO 2017/053048 | | 3/2017 | |
| WO | WO 2017/126282 | | 7/2017 | |
| WO | WO 2018/208289 | | 11/2018 | |

OTHER PUBLICATIONS

U.S. Appl. No. 16/404,655 Final Office Action mailed Dec. 19, 2022.

U.S. Appl. No. 16/404,655 Office Action mailed Jul. 27, 2022.

U.S. Appl. No. 16/404,655 Final Office Action mailed Apr. 8, 2022.

U.S. Appl. No. 16/404,655 Office Action mailed Sep. 1, 2021.

U.S. Appl. No. 16/404,655 Final Office Action mailed Apr. 8, 2021.

U.S. Appl. No. 16/404,655 Office Action mailed Jan. 15, 2021.

U.S. Appl. No. 16/404,655 Office Action mailed Oct. 3, 2023.

U.S. Appl. No. 16/883,275 Final Office Action mailed Jul. 7, 2022.

U.S. Appl. No. 16/883,275 Office Action mailed Nov. 26, 2021.

U.S. Appl. No. 16/911,111 Office Action mailed Aug. 3, 2022.

U.S. Appl. No. 16/911,111 Final Office Action mailed Apr. 6, 2023.

U.S. Appl. No. 16/911,111 Office Action mailed Jul. 27, 2023.

U.S. Appl. No. 16/883,275 Notice of Allowance mailed Jan. 17, 2024.

U.S. Appl. No. 18/138,840 Office Action mailed May 16, 2024.

Crumb & Foster, "Two Factor Authentication" Version 1.0, 2018.

Misra et al., "Guide to Wireless Mesh Networks", Springer, 2009.

Wang, et al., "Preserving privacy for free: Efficient and provably secure two-factor authentication scheme with user anonymity", Information Sciences, 321:162-178, 2015.

U.S. Appl. No. 16/404,655 Office Action mailed Apr. 3, 2023.

U.S. Appl. No. 16/883,275 Office Action mailed Apr. 5, 2023.

Akyildiz et al., Ian F., Wang, Xudong, Wang, Weilan, "Wireless mesh networks: a survey", Science Direct, Computer Networks Jan. 1, 2005.

Al-Fairuz et al., Mohamed, "Multi-channel, Multi-level Authentication for More Secure eBanking" pp. 8; Jul. 3, 2017.

Bontu, Chandra S., Peryalwar, Shalini, and Pecen, Mark; "Wireless Wide-Area Networks for Internet of Things", IEEE Vehicular Technology Magazine, IEEE Xplore, Published Jan. 31, 2014, 10 pages.

"Building a Rurul Wireless Mesh Network" by David Johnson, Karel Matthee, Dare Sokoya, Lawrence Mboweni, Ajay Makan, and Heng Kotze, pp. 44; Oct. 30, 2007.

Chowdhury, Kaushik R.; "Cognitive Wireless Mesh Networks with Dynamic Spectrum Access", Student Member, IEEE, and Ian F. Akyildiz, Fellow, IEEE. IEEE Journal on Selected Areas in Communications, vol. 26, No. 1, Jan. 2008, pp. 14.

Khudoyberdiev et al., Azimbek; "A Novel Approach towards Resource Auto-Registration and Discovery of Embedded Systems Based on DNS", Electronics, Published Apr. 17, 2019.

Renaud et al., Karen "A Support Architecture For Multichannel, Multifactor Authentication" pp. 9; Apr. 2, 2014.

Willeke, Jim; "Multiple-channel Authenitication", pp. 2, revised on Jul. 3, 2017.

* cited by examiner

340

350

330

Display
320

User Device
310

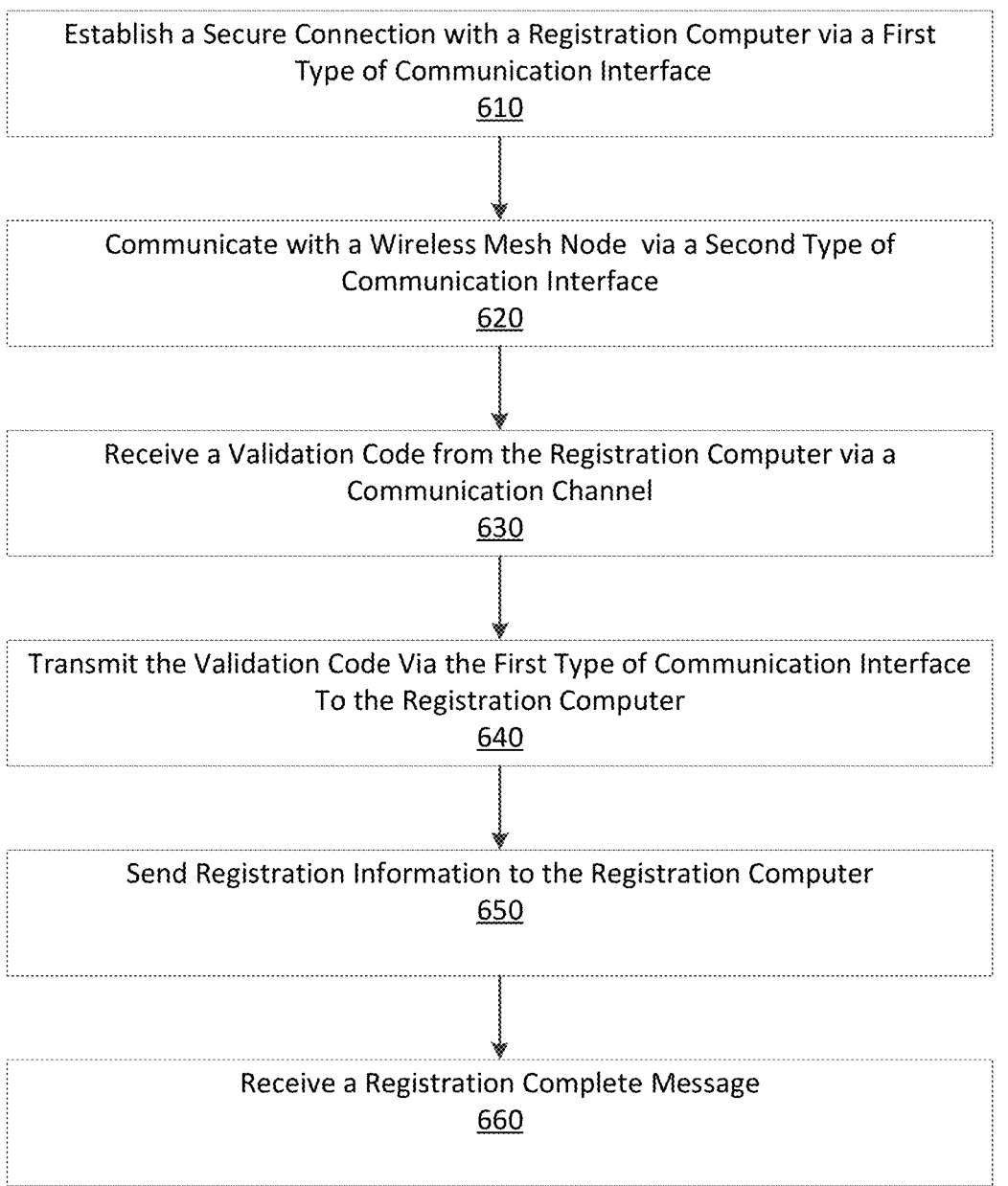

Establish a Secure Connection with a Registration Computer via a First
Type of Communication Interface
610

Communicate with a Wireless Mesh Node via a Second Type of
Communication Interface
620

Receive a Validation Code from the Registration Computer via a
Communication Channel
630

Transmit the Validation Code Via the First Type of Communication Interface
To the Registration Computer
640

Send Registration Information to the Registration Computer
650

Receive a Registration Complete Message
660

FIG. 6

SECURING TRANSMISSION PATHS IN A MESH NETWORK

CROSS-REFERENCE TO RELATED APPLICATIONS

The present application is a continuation and claims the priority benefit of U.S. patent application Ser. No. 16/911, 111 filed Jun. 24, 2020, now U.S. Pat. No. 12,075,246, which is a continuation in part of and claims the priority benefit of U.S. patent application Ser. No. 16/404,655 filed May 6, 2019, now U.S. Pat. No. 12,022,295, which is a continuation in part and claims the priority benefit of U.S. patent application Ser. No. 16/397,935 filed Apr. 29, 2019, now U.S. Pat. No. 10,972,916.

U.S. patent application Ser. No. 16/911,111 claims the priority benefit of U.S. provisional application 62/942,811 filed Dec. 3, 2019. The disclosures of all of the foregoing applications are incorporated herein by reference.

BACKGROUND OF THE INVENTION

Field of Invention

The present invention generally relates to registering devices as part of a wireless network. More specifically, the present invention relates to a process that uses secure communications to register devices as part of a wireless mesh network.

Description of the Related Art

Every day the use of wireless networks is expanding. Various vendors provide redundant wireless links that allow wireless data communications to be switched between different pieces of computer hardware as needed. For example, communications may initially be passed via a first wireless access point only to have those communications switched and passed via a second wireless access point should the first wireless access point fail or become overloaded with traffic. Communications may be switched or 'handed off' from the first to the second wireless access point when a mobile device is moved from one place to another. Wireless mesh networks predominantly use communications consistent with one of the 802.11 (or "Wi-Fi") wireless communication standards. Because of this, 802.11 communication channels are a preferred type of communication channel used in wireless mesh networks.

The constituency of any given network may vary significantly. For example, a first wireless network may include two wireless access points and a second wireless network may include dozens of wireless access points. The two networks may allow communication amongst one another by way of one or more of the foregoing access points.

A local network topology in which the infrastructure (e.g. bridges, switches, and other infrastructure devices) connect directly, dynamically, and non-hierarchically to as many other nodes as possible and cooperate with one another to efficiently route data from/to clients is generally referred to as a mesh network. This lack of dependency on one node allows for multiple nodes to participate in the relay of information. Once properly configured, mesh networks can dynamically self-organize and re-configure, which can reduce maintenance overhead. The ability to re-configure also enables dynamic distribution of workloads, particularly in the event a failure in the network. Individual access points in the network may be referred to as mesh nodes, mesh points, or mesh portals. Mesh networks can also allow for integration with hubs, routers, or switches in conventional wired networks (and the traffic communicated thereupon) or otherwise bypass the same by performing functions consistent with a wired hub, router, or switch.

Initially—and properly—setting up and configuring a wireless mesh network can be time consuming not to mention inefficient and error prone. Failure to properly configure a network can also lead to security lapses, network instability, or problems with scalability. In some instances, once a wireless mesh network is setup, adding additional wireless access points to that network may not be readily achieved without significant human intervention and the other inefficiencies and problems referenced above. This includes implementing security or other network updates that might be required from time-to-time.

One option for securely configuring wireless access points relies on connecting a network cable (such as an Ethernet cable) to each respective access point to configure the access point. Each respective access point is then configured in a serial fashion. While Ethernet connections are generally not encrypted, they have the benefit of being physical. Thus, if physical connections are secure then the data transmitted by way of said physical connection between each physical port is likewise secure. But such a serial setup methodology does not scale. The configuration of 10 mesh nodes takes 10 times longer than setting up a single mesh node because of the physical configuration requirement. And this is to say nothing of mobility and physical access.

A second option that may be employed to securely setup a wireless mesh networks is to configure a fixed number of wireless access points when those access points are manufactured. Once this fixed number of access points are factory configured to securely communicate with one another, they can be installed and securely operate in accordance with said configuration. While configuration during the manufacturing process may enjoy the advantage of easy and secure installation, it suffers from scalability limitations in the context of network and security updates, replacement of out-of-date equipment, and ensuring interoperability between hardware and the software operating thereupon (including but not limited to security applications). While this option may be appropriate for smaller mesh networks where there may be no need for the size of that mesh network to increase over time.

A third option that may be used to setup a wireless mesh network is by using non-secure wireless data communications to initially configure wireless access points to later operate in a secure fashion. While this option provides the ability for a wireless mesh network to be expanded or updated, every time a wireless access point is configured, there exists data being wirelessly communicated and that can be observed or exploited by individuals with nefarious intent. This provides a window of vulnerability that exposes a larger network or element thereof to being attacked. For example, a hacker could pretend to be a new access point or could pretend to be a device attempting to connect to the wireless network using information that was observed (snooped) by the hacker during the window of vulnerability.

A still further option involves an onboarding service web portal. Such tools allow a user to login and manually input the access point device serial numbers to complete the registration process. This manual process is error-prone, tedious, and requires users to spend a large amount of time collecting device information and entering that information into a web portal one-by-one. Even if a user were to utilize the likes of an Excel spreadsheet whereby a software program accesses the cells of said spreadsheet during the network setup process still relies upon error-prone manual data entry. This is to say nothing of maintaining the spreadsheet over time.

There is a need for ways of securely installing, provisioning, and configuring wireless access points and other devices that communicate with a wireless mesh network.

SUMMARY OF THE CLAIMED INVENTION

A first claimed embodiment of the present inventions includes a registration computer, a wireless mesh node device, and an electronic device. The electronic device establishes a secure communication session with the registration computer using a first type of communication interface. The electronic device then communicates with the wireless mesh node via a second type of communication interface and receives a verification code from the registration computer that was sent over a communication channel. The registration computer stores the validation code sent to the electronic device for later use. Next, the electronic device securely sends the verification code received over the communication channel to the registration computer over the first type of communication interface. The registration computer then compares the validation code received via the first type of communication interface with the stored validation code when the registration computer validates the electronic device by identifying that the two validation codes match. The electronic device then sends registration information to the registration computer that includes information unique to the wireless mesh node, after which the wireless mesh node is allowed to join a wireless mesh network based on the unique information.

In a second claimed embodiment, an electronic device establishes a secure communication session with a registration computer using a first type of communication interface. The electronic device communicates with a wireless mesh node using a second type of communication interface and receives a verification code from the registration computer that was sent over a communication channel. The registration computer stores the validation code sent to the electronic device for later use. Next, the electronic device securely sends the verification code received over the communication channel to the registration computer over the first type of communication interface. The registration computer may compare a validation code with the stored validation code when validating the electronic device. Registration information is then sent to the registration computer that includes information unique to the wireless mesh node and the wireless mesh node may be allowed to join a wireless mesh network based on that unique information.

A third claimed embodiment involves a method implemented in a non-transitory computer-readable storage medium. A processor may execute instructions out of a memory at an electronic device that performs the method. The method includes communicating with a wireless mesh node and receiving a verification code from a registration computer that was sent over a communication channel. The registration computer may store the validation code sent to the electronic device for later use. Next, the verification code received over the communication channel is sent to the registration computer over a first type of communication interface. The registration computer may then compare the validation code sent over the first type of communication interface with the stored validation code when validating the electronic device. Registration information is then sent to the registration computer that includes information unique to the wireless mesh node and the wireless mesh node may be allowed to join a wireless mesh network based on that unique information.

BRIEF DESCRIPTION OF THE DRAWINGS

FIG. 6 illustrates a method for establishing secure transmission paths in a mesh network.

DETAILED DESCRIPTION

The present disclosure relates to securely setting up mesh networks in a manner that does not require significant investments of physical hardware and further avoiding the unnecessary or excessive transmission of unencrypted information wirelessly from or to mesh devices when a mesh network is setup. Embodiments of the present invention may use different communication interfaces and different types of channels to ensure that devices included in or being added to a wireless mesh network communicate securely. Methods and apparatus may use a combination of secure communication methods such as secure hypertext transfer protocol (HTTPS) communications, low power signals that travel over short distances, and other types of communications to create a system that uses secure communications when setting up or expanding a wireless mesh network. Dual factor (back-channel, two-factor) verification may also be used as part of a process that allows a wireless mesh network to be setup more securely.

Methods and apparatus may allow a user to choose which mesh nodes can join a network. These methods may allow a user to specificity a custom profile that includes rules that identify how mesh network identifiers (IDs) are used or that identify passcodes/passphrases assigned to a particular network. Methods consistent with the present invention may also identify types of traffic that may be passed through particular 802.11 radio channels or may identify other parameters that control how traffic is switched between devices in wireless mesh network.

Figure 1:
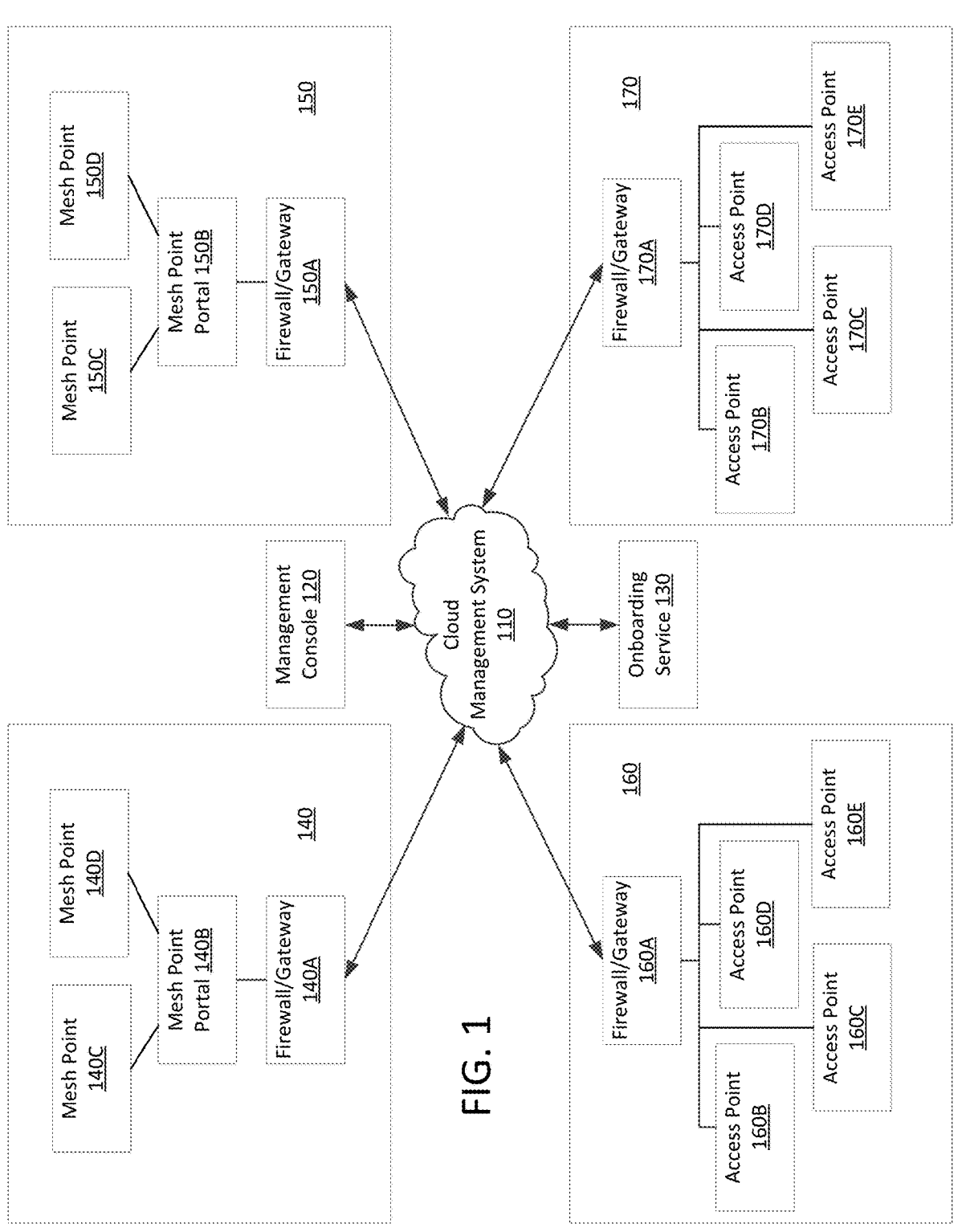
FIG. 1 illustrates a system that may be used to efficiently configure computing devices at a wireless mesh network.

FIG. 1 illustrates a system that may be used to efficiently configure computing devices at a wireless mesh network. FIG. 1 includes a management system 110 that may reside in a cloud computing environment. Management system 110 may be accessed via various types of computer network known in the art including both wired and wireless. Cloud management system 110 may perform functions associated with the creation or expansion of specific wireless mesh networks. Cloud management system 110 may store wireless mesh node serial numbers and configuration information of a wireless mesh network. The cloud management system 110 of FIG. 1 and 510 of FIG. 5 may permanently register particular wireless mesh node serial numbers with a particular customer or with a particular mesh node configuration or topology at a customer site.

FIG. 1 includes management console 120 and onboarding service 130 that may be part of management system 110. Management console program code associated with management console 120 may allow a processor to receive and process information from cloud management system 110 when network configurations or network management rules are set. Program code of onboarding service 130 may allow information relating to a network configuration to be stored in a database that cross-references customer information with mesh node device identifying information, and with identifiers that identify computing devices that are authorized to communicate over a particular mesh network. Program code of management console 120 may also allow administrators to set policies or preferences relating to a particular mesh network via a user interface or graphical user interface (GUI). As such, cloud management system 110, management console 120, and onboarding service 130 may function in a manner consistent with the cloud management system 510 of FIG. 5.

FIG. 1 also includes various sets of networked clusters of computing devices 140, 150, 160, and 170. A first set of networked computing devices 140 includes firewall/gateway 140A, mesh portal 140B, and mesh points 140C & 140D. A second set of networked computing devices 150 includes firewall/gateway 150A, mesh portal 150B, and mesh points 150C & 150D. A third set of networked computing devices 160 includes firewall/gateway 160A and access points 160B, 160C, 160D & 160E (160B-160E). A fourth set of networked computing devices 170 includes firewall/gateway 170A and access points 170B, 170C, 170D & 170E (170B-170E).

Mesh portals consistent with the present disclosure may wirelessly communicate with a plurality of wireless mesh points and over a wired network. A mesh portal may act as a gateway between wireless mesh points and a wired local area network. A mesh portal may broadcast transmissions that include a mesh identifier (MSSID) and a cluster name that advertise the wireless network to mesh points that are configured to operate as members of a particular wireless mesh network. A mesh point may also include a cellular (e.g. 3G, 4G, LTE, or 5G) link or more than one mesh node in a mesh network may be configured to operate as a redundant mesh point that uses a wired or a wireless network connection.

The terms "access point" or "wireless access point" in the present disclosure refer to a device that may be wirelessly communicatively coupled to a computer directly with or without wireless communications passing through another wireless device. As such, the terms "access point" or "wireless access point" may refer to either a mesh portal or mesh point.

The term "mesh portal" may relate to a wireless device that performs functions that a "mesh point" need not perform. Both mesh portals and mesh points may perform functions consistent with a wireless access point because both mesh portals and mesh points may act as a wireless access point that directly wirelessly communicates with a computer. The term "mesh node" in the present disclosure may be used to refer to either a mesh portal or a mesh point that uses wireless communications to transmit and receive wireless computer network messages and data.

The terms "firewall" or "gateway" in the present disclosure may refer to computing devices that communicate over wired network connections. A mesh node may, however, include functionality consistent with a firewall or gateway. Functions conventionally associated with a firewall or gateway may be performed by a mesh portal or by mesh point. In these instances, a mesh portal or a mesh point may perform functions consistent with evaluating content ratings, deep packet inspection, or may include anti-virus program code.

A mesh portal may be configured to transmit and receive data network communication traffic between two different types of computer network, for example, between a network that communicates over wires and a network that uses wireless 802.11 signals. Alternatively or additionally, a mesh portal may transmit and receive data network communication traffic between a cellular network and an 802.11 network. Mesh points, however, may be limited to receiving and transmitting network traffic wirelessly over a single type of network, for example, over an 802.11 network. While mesh portals include different functionality as compared to a mesh point, certain mesh points may be configured to assume the role of a mesh portal.

Once configured, mesh points consistent with the present disclosure may communicate using wireless 802.11 communications only, or some of these mesh points may be configurable to be promoted to assume the functionality of a wireless mesh portal. While communications in a mesh network may be sent through any number of mesh points until those communications reach a mesh portal, most mesh points may typically be located within three hops of a mesh portal. Furthermore, a number of mesh portals that communicate with a mesh point may be limited by a rule or setting. For example, a rule may limit a number of mesh portals connected to a particular mesh portal to eight or another rule may limit a number of hops to three.

The mesh point portals (140B & 150B), mesh points (140 C/D & 150 C/D) of FIG. 1 may be wireless mesh nodes that allow mobile devices or other computers to redundantly connect to networks 140 or 150. For example, a user device may initially connect to network 140 using mesh point 140C. Communications may later be sent to mesh point 140D. This may occur when mesh point 140C is unreliable, fails, is overloaded, or when a signal strength of mesh point 140C is weaker than the signal strength of mesh point 140D.

The mesh points illustrated in FIG. 1 may include similar functionality as functionality performed by a mesh portal. Mesh point portals may include additional functionality that may not be provided by a mesh point in a given network. For example, mesh point portal 140B may be able to send transmissions over a wired network to firewall/gateway 140A. Alternatively or additionally, mesh point portals may be configured to communicate with other computing devices wirelessly.

Mesh point portal 140A may communicate with cloud management system 110 or with other devices via a cellular network, while mesh point portal communicates with other devices (such as user devices, mesh point 140C, or mesh point 140D) using standard 802.11 wireless communications. Computing devices associated with networks 160 or 170 include firewall/gateway (160A & 170A) and various access points (160B-160E & 170B-170E). Each of these different access points may include wireless communication capabilities like the mesh points 140C/140D and mesh portal 140B of network 140, for example.

Computing devices connecting to a particular mesh network and mesh nodes (mesh points or mesh portals) may be setup and configured using methods that increase security by using shared secrets or that use privileged communication pathways. These shared secrets or privileged communication pathways may be difficult or impossible to observe (snoop) or hack. For example, a particular computing device may be configured to communicate with cloud management system 110 of FIG. 1 via a secure tunnel during a configuration process that also uses a different communication technique to share information between a mesh point and a user device. This different communication technique may include sending information between the mesh point and the user device via a short distance/low power communication connection, such as a Bluetooth® or Bluetooth® communication connection. Data transmitted via this low power communication connection could be difficult to snoop or hack in instances when a hacker is physically located out of range of a low power data communication signal.

Processes for configuring and setting up devices in a wireless mesh network may also include two-factor authentications, where secret information is sent to a user device. For example, a message that includes secret information may be sent to an email address or may be sent in the form of a text message to the user device. This secret information may then be used to secretly validate or identify that the computing device can be allowed to communicate with devices at a wireless mesh network. A user device may provide a secret code that was received via a text message from a computer located at the cloud or Internet to a wireless access point. This secret information may be provided to a user device via a type of communication channel that is different from a type of communication channel that communicates other information. One communication channel type may be a cellular communication channels and another type of communication channel may be a wireless 802.11 channel.

Once validated, a user device may be able to connect to a particular mesh network from anywhere. For example, a configuration at a validated user device may allow that user device to connect to the mesh network via a cellular connection when that user device is located at a location far from an 802.11 mesh network. In such an instance, the user device may communicate with other devices that are located within a zone, where these other devices may communicate via the mesh network using communications consistent with an 801.11 WI-FI® communication channel.

When a mesh network is configured, communications may pass from one or more mesh nodes (mesh point or mesh portals) as those mesh nodes are provisioned with software or configured using onboarding service 130 of FIG. 1. Program code of onboarding service 130 may allow information relating to a network configuration to be stored in a database that cross-references customer information with mesh node device identifying information, and with identifiers that identify computing devices that are authorized to communicate over a particular mesh network. Because of this, onboarding service 130 may register serial numbers identifying particular wireless mesh nodes with a customer and with a network configuration specific to that customer.

Management consoles 120 may be used to organize and store data associated with particular mesh networks in a database. Data stored in such a database may cross-reference customer identifying information with machine (MAC) addresses/identifiers that identify mesh node devices that have been configured to operate in that particular customer's wireless mesh network. Data stored in this database may also cross-reference MAC addresses or other information that identifies computing devices that are authorized to connect to a particular customer's wireless mesh network. MAC addresses or other identifying information stored in the database may be copied to memories resident within a particular mesh network. After sets of configuration information are stored, additional mesh nodes may be added to the mesh network in a manner that requires little or no user intervention.

For example, a user device may scan a label, a bar code, a quick response (QR) code, or a near field data communication (NFC) tag/chip that identifies the new mesh node component. Once that new mesh node component has been identified and cross-referenced to a particular customer account, that new component may be provisioned with software and configured automatically. Low power data communications may allow an authorized user device to securely configure a single or a group of wireless access points. Such capabilities allow communications of a wireless mesh network to be secure, even when networks are initially configured or when new wireless access points are added to a wireless mesh network.

Whenever mesh nodes in a mesh network are powered on (boot up) they may communicate with each other when identifying best pathways that can be used to pass network communications. Different frequencies may be used to transmit 802.11 communications and these frequencies may be configured by one or more rules that direct certain types of communication traffic to a particular radio frequency. For example, communications that use 5 gigahertz (GHz) signals may be used to transfer network associated data and client traffic and communications that use 2.4 GHz signals may be used only for client data. Furthermore, each mesh node (mesh point or mesh portal) may be configured and provisioned according to a consistent profile according to one or more rules. Profiles for a certain mesh network may be stored in a memory associated with a user mobile device that participates in the registration and configuration of wireless mesh nodes or may be stored in a database at a server that administrates a registration or onboarding process.

Figure 2:
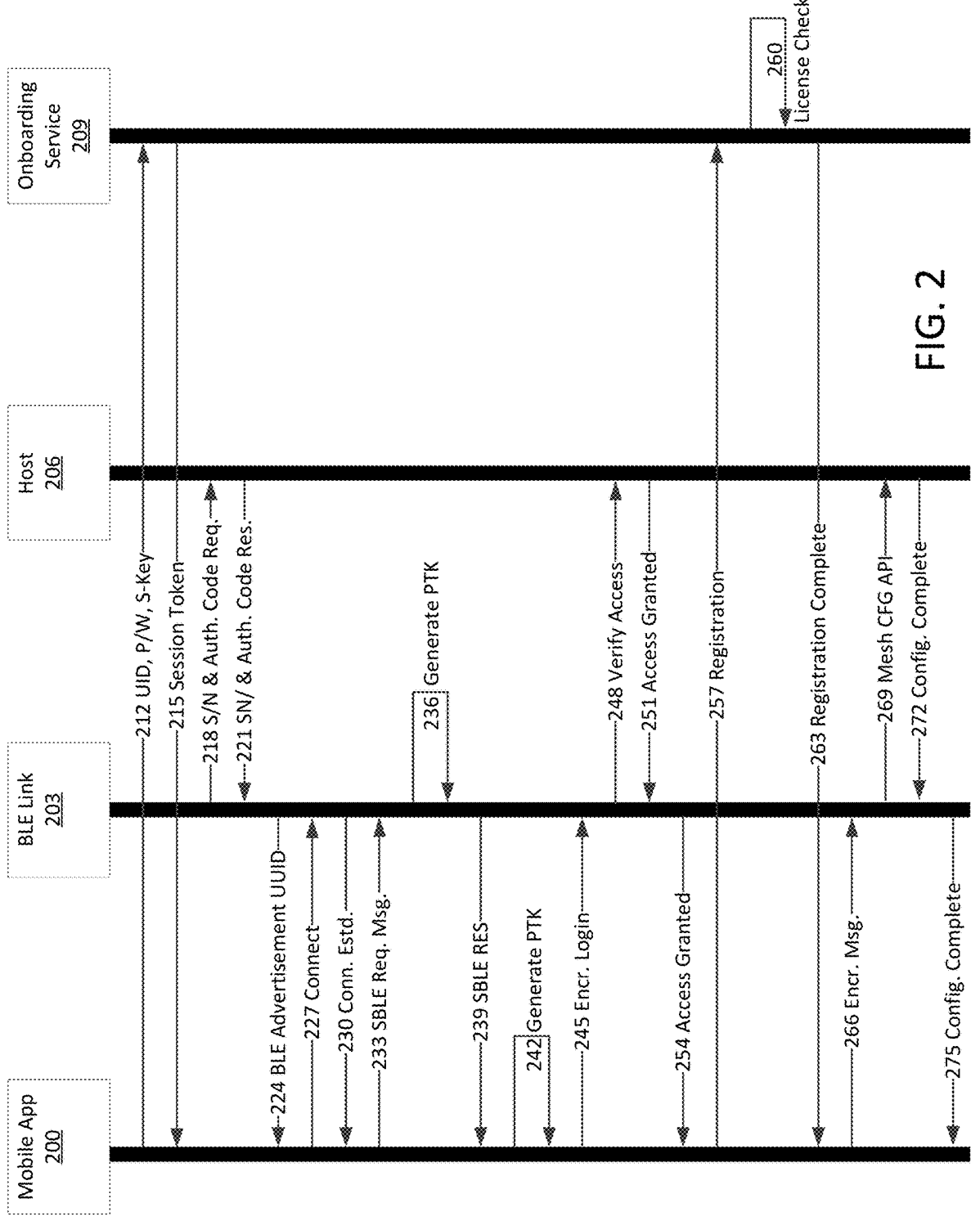
FIG. 2 illustrates communications that may be performed when a computing device is registered and configured to communicate with a mesh network.

FIG. 2 illustrates communications that may be performed when one or more computing devices are registered and configured to communicate with a mesh network. FIG. 2 includes actions performed by a mobile device that may communicate with a host computer 206 via a short distance wireless link (such as a Bluetooth® or low power Bluetooth® communication link) 203. At least a portion of a process that registers mobile app 200 may be performed via operation of program code on onboarding service 209. Host computer 206 may be a computer at a customer site that communicates with a management system, such as cloud management system 110 of FIG. 1 when operations of onboarding service 130 of FIG. 1 or 209 of FIG. 2 are performed. Host 206 may be a wireless mesh node that performs function of BLE link 203 and host 206 and these different functions may be performed using different processors at the wireless mesh node. Instructions associated with onboarding service 130 of FIG. 1 or 550 of FIG. 5 may perform the same functions described in respect to onboarding service 209 of FIG. 2. Program code instructions associated with onboarding service 209 may be executed by a processor at a cloud computing device and program code residing at the mobile device may include instructions associated with mobile app 200. Instructions of onboarding service executed by a computer such as the cloud management system 110 of FIG. 1 or 510 of FIG. 5.

Figure 5:
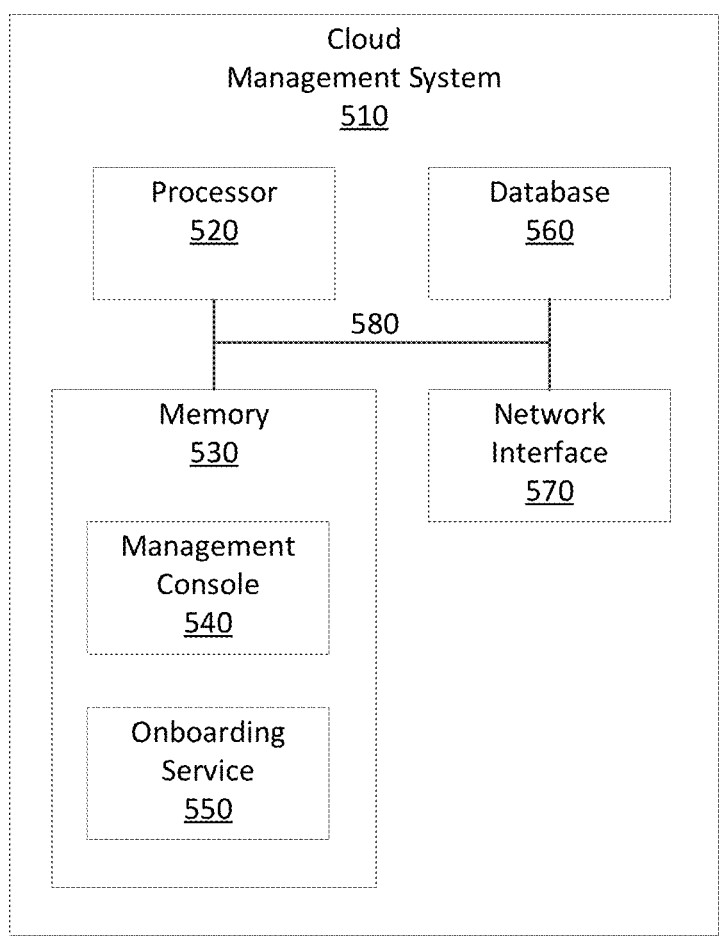
FIG. 5 illustrates components that may be included in a management system residing in the cloud or Internet that may provide information necessary to setup a wireless mesh network.

Initially, program code of mobile application 200 may prepare a message 212 to send to an onboarding service 209 performed by a cloud management system 110 or 510 of FIG. 1 and FIG. 5. This communication may be passed by communication mediums known in the art including wireless cellular communication links. Message 212 may be sent via a secure communication protocol, such as the secure hyper-text transfer protocol (HTTPS). By using a secure communication protocol, information may be securely provided to cloud management system 110 of FIG. 1 or 510 of FIG. 5 that executes program code consistent with onboarding service 209. Message 212 may be passed through host 206. Alternatively, message 212 may be passed directly to the computer executing the instructions of onboarding service 209, without passing through host 206. The computer executing instructions of onboarding service 209 may be the cloud management system 110 of FIG. 1 or the cloud management system 510 of FIG. 5. Message 212 may include a user identifier (UID), a password, and a security key. After the login information has been sent to the computer system that manages onboarding service 209, that management computer system may execute of the onboarding service 209 program code. These instructions may cause a unique session token to be sent to a mobile device executing instructions associated with mobile application 200. Mobile application 200 may include instructions that when executed by a processor at a mobile device to access a cloud management system, such as cloud management system 110 of FIG. 1 or 510 of FIG. 5.

Message 212 may be part of a process where a secure communication session is established between the computer executing onboarding service 209 and a mobile device executing program code of mobile application 200. Program code associated with onboarding service 209 may also use a two-factor authentication process to validate a user device before issuing a session token. For example, a cloud computing device (such as cloud management system 110 or 510 of FIG. 1 and FIG. 5) may send a text message, email, or voice (audio) message that includes a code that must be provided to the cloud computer before a session token is sent to a mobile device in communication 215 of FIG. 2. Communications between the mobile device executing instructions of mobile application 200, may allow cloud management system (110 or 510) to provide information via management console 120 of FIG. 1 or 540 of FIG. 5.

BLE link 203 may be coupled to a first processor at a wireless access point that communicates with a second processor at host 206. The first processor at the wireless access point may perform tasks including those associated with messages or processes 218, 221, 224, 227, 230, 233, 236, 239, 245, 248, 251, 254, 266, 269, 272, and 275 and the second processor at the host may perform tasks associated with, for example, messages or processes 218, 221, 248, 251, 269, and 272. Other low power data communication technologies may be used when a wireless mesh network is setup. For example, a proprietary wireless communication technique may be used or a high bandwidth short distance millimeter radio wave transducers. Processes performed by BLE link 203 and host 206 may be performed by a single device, such as a wireless mesh node and communications between BLE link 203 and host 206 may use a wired communications signals as opposed to wireless communication signals. When functions of BLE link 203 and host 206 are performed within a same computing device, functions of BLE link 203 and host 206 may be performed by different processors at that computing device.

A person configuring their wireless mesh network may then use their mobile device to scan a barcode, a quick response (QR) code, or a near field data communication (NFC) tag to obtain information associated with host 206. After the mobile user device has scanned a code or tag like that shown in FIG. 3, authentication information may be sent via short distance wireless link 203 to host 206 in communication 218 of FIG. 2. A response to that authentication request may be received in communication 221 of FIG. 2.

Authentication request 218 may include a serial number of host computer 206 and may include an authentication or authorization code. Authentication request 218 may be sent by circuitry, a chip, or a processor that communicates with a mobile device using Bluetooth® communications (BLE) link 203 and that communicates with a processor of host computer 206. Communication 221 is a response message that may pass the serial number of host computer 206 and the authentication code from the processor of host 206 back to the circuitry, the chip, or the processor of BLE link 203. Since communications sent via wireless link 203 are low power wireless signals, only devices within a particular distance of host 206 would be able to receive information sent via low power wireless link 203. The use of low power wireless link 203 allows devices to initiate a relatively secure registration process using communications that have a very limited range.

The mobile device used to setup a wireless mesh network may scan QR or other codes associated with several different wireless mesh nodes during a configuration process. As a result, different mesh nodes may be registered via an automated batch process or using processes that register these mesh nodes in a parallel or semi-parallel way. For example, QR codes of a first and a second wireless mesh node may be scanned by a mobile device. Afterwards, Bluetooth® communications between the mobile device and each respective mesh node may communicate information consistent with steps 218 and 221 of FIG. 2.

The first and second wireless mesh nodes may communicate in parallel with the mobile device by using different Bluetooth® connections, may communicate with the mobile device using interleaved communications, or may serially communicate with the mobile device. An example of interleaved communications includes an authorization code associated with the first mesh node being sent from the mobile device to the first mesh node after which the mobile device sends an authorization code associated with the second mesh node to the second mesh node before the mobile device receives a response message. From the perspective of the user, the overall process of registering or configuring these different mesh nodes appears to occur in parallel even when one or more communications of such a registration or configuration process may be performed using sequential communications, interleaved communications, or other techniques.

BLE link 203 may then broadcast advertisement messages 224 to devices within range of the low power BLE link 203. This advertisement may be in a format consistent with a low power Bluetooth® advertisement that may include an encoded universal unit identifier (UUID). This encrypted UUID may include an authorization code, a system status, and a serial number. The authorization code of message 224 may be the same authorization code associated with communications 218 and 221. The mobile application 200 at a mobile device may then compose a connect message 227. A Bluetooth® connection message 230 may then be sent to the mobile device when a secure low power/Bluetooth® communication session is established between the host 206 and the mobile device.

After the low power communication session has been established, mobile application 200 may then generate request message 233 to send to the BLE link 203 of FIG. 2. This request message may include a first random/pseudo random number (or first nonce). Next, a process at the BLE link 203 may generate a second random/pseudo random number (or second nonce) and may generate a pairwise temporary key (PTK) during process 236 of FIG. 2. This temporary key may have been generated using the first nonce, the second nonce, a machine (MAC) address of the mobile device, a MAC address of host 206, a serial number, or other information. This temporary key may also be created using a hash of information. The MAC address of the mobile device may have been provided to host 206 based on connect message 227 of FIG. 2. The various low power or Bluetooth® communications illustrated in FIG. 2 (e.g. communications 224, 227, 230 & 233) may be performed in parallel, may be performed using interleaved communications, or may be serially performed when multiple different mesh nodes are registered and configured.

BLE link 203 may then generate message 239 that includes a machine integrity code (MIC) and the second nonce. After message 239 is generated, it may be sent to the mobile device. Mobile application 200 may then extract the MIC and the second nonce from message 239 and a processor at the mobile device may generate the pairwise temporary key using information that may include the first nonce, the second nonce, the mobile device MAC, the host MAC, the serial number, the authentication code, or other information in process 242 of FIG. 2.

The processor at the mobile device may then compute its own version of the MIC and compare that re-computed MIC with the MIC included in message 239 when verifying the pairwise temporary key during process 242 of FIG. 2. The processor at the mobile device may then encrypt a login message that is sent to host 206 over BLE link 203. This encrypted login message may include a user name, a password, and an authentication code. Host 206 may then verify this login information during process 248 of FIG. 2.

Host 206 may then prepare an access granted message during process 251 that is sent to the mobile device as access granted message 254 of FIG. 2. The mobile device may then send registration message 257 to the cloud computer that executes instructions consistent with onboarding service 209. Message 257 may be sent over the secure tunnel to the cloud computer. Registration message 257 may include a user identifier (UID), the session token from message 215, a serial number, and an authentication code. Registration message 257 may also include settings set by a user accessing mobile application at a mobile or other computing device.

The cloud computer executing the instructions consistent with onboarding service 209 may validate the mobile device during process 260 to ensure that the user device is associated with a valid license or valid customer account. Step 260 may also validate information associated with a mesh node that includes BLE link 203 and host 206. This validation information may include a serial number of a mesh node device and an authorization code associated with the mesh node device. This validation process may include accessing a database that stores information that cross-references mesh node serial numbers with authorization codes.

When a particular mesh node device is manufactured, it may be assigned a serial number and an authorization code and this information may have been stored in the database as part of a manufacturing process associated with building or packaging a mesh node device. This information may also include a model number and/or a revision number and either of these model or revision numbers may be used to identify the capabilities of a particular mesh node device.

For example, a mesh node device may be assigned a serial number of A1234ADAD221 and an authorization code of Zebra221. This mesh node device may have been built as a model A1000Z and mesh node devices with model A1000Z may identify a processor type or an amount of non-volatile memory built within that mesh node device. Model number information may also be used to identify whether a particular mesh node device can be used as a mesh portal, a mesh point, or both. Mesh node serial number 1234ADAD221 may be a unique number assigned to only one single mesh node device. The validation process may access the database to retrieve an authorization code associated with serial number 1234ADAD221 and the retrieved authorization code Zebra221 may be compared with information received in registration message 257 of FIG. 2.

When this comparison identifies that a serial number and an authorization code included in registration message 257 matches the serial number and authorization code stored in the database, a particular mesh node may be validated as being an authentic mesh node. Information associated with a mobile device that sent registration message 257 may also be included in registration message 257 and this information may be used to associate that mobile device with the mesh node. In certain instances, this information associated with the mobile device may be used to register that mobile device with onboarding service 209 automatically after mesh node serial number and authentication codes have been authenticate.

Alternatively, the information associated with the mobile device may be a unique number such as a serial number or MAC of the mobile device. This information, too, may have been assigned as part of an additional registration process that associates the mobile device with a particular customer or customer license. When an additional authentication process is used to register a particular mobile device may include the mobile device downloading mobile application 200 and may include the mobile device sending information that identifies a customer (e.g. using a customer identifier or number) that the mobile device may be associated with a wireless mesh network. Information that identifies the mobile device and the customer may also be stored in the database. In such instances, license check process 260 may include associating the mesh node identified by the serial number and authentication code included in registration message 257 with the customer. As such, information stored in the database may cross-reference a mobile device, with a customer identifier, with a mesh node, and with a mesh network owned by the customer identified by the customer identifier.

The cloud computer may store information that associates host 206 and the user device serial number (or MAC address/identifier) with a particular wireless mesh network and with a particular customer. After the mobile device, the mesh node, or both are authenticated, onboarding service 209 may then prepare a message to send to the mobile device and the cloud computer may then send a registration complete message 263 to the mobile device. After receiving the registration complete message, the mobile application 200 at the mobile device may then send an encrypted message 266 via wireless link 203. This encrypted message may include an encrypted version of the pairwise temporary key that was calculated during process 242 of FIG. 2.

After encrypted message 266 is sent, that message may be decrypted according to an encryption standard using the pairwise temporary key generated during process 236 of FIG. 2. This decryption may be performed during process 269 of FIG. 2. This decryption may be performed using an application program interface (API) call that may be referred to as a mesh configuration API call. Process 269 may also include setting a configuration after which process 272 may compose a configuration complete message 275 to send to the mobile device.

After completing this configuration process, the mobile device executing program code consistent with mobile application 200 may securely communicate with computing devices at the Internet via one or more different mesh nodes devices included in the newly configured mesh network. Host 206 may be a mesh point or a mesh point portal like those illustrated in FIG. 1. Operation of mobile application 200 may allow a mobile device to find and identify all compatible mesh points or mesh portals that are associated with a mesh network. In certain instances program code of mobile application 200 may allow a mobile device to communicate with compatible mesh nodes (mesh points or portals) when multiple mesh nodes are registered, provisioned with software, or simultaneously configured.

Methods and apparatus consistent with the present disclosure may allow a user to choose which mesh nodes can join a network and that user may specificity a custom profile that may include rules that may identify how mesh network identifiers (IDs) are used or that identify passcodes/passphrases assigned to a particular network. These methods may identify types of traffic that may be passed through particular 802.11 radio channels, or other parameters that may control how traffic is switched between devices in a particular wireless mesh network. This combined with dual factor verification and the use of low power wireless communication channels make methods and apparatus consistent with the present disclosure easy to deploy and expand according to the wishes of users that are responsible for establishing and maintaining specific wireless mesh networks.

Mesh IDs and passcodes/passphrases may be based on a timestamp or equipment identifiers that insure that a mesh ID or other information are unique. Settings or profile information may be instantiated by way of application 200 of FIG. 2. Profile information may alternatively be received from onboarding service 209 when a wireless mesh node is added to an existing wireless mesh network for which profile information already exists. Information that cross-references customer information with a particular network profile may be accessed by onboarding service 209 when a new wireless mesh node is added to the existing wireless mesh network.

Figure 3:
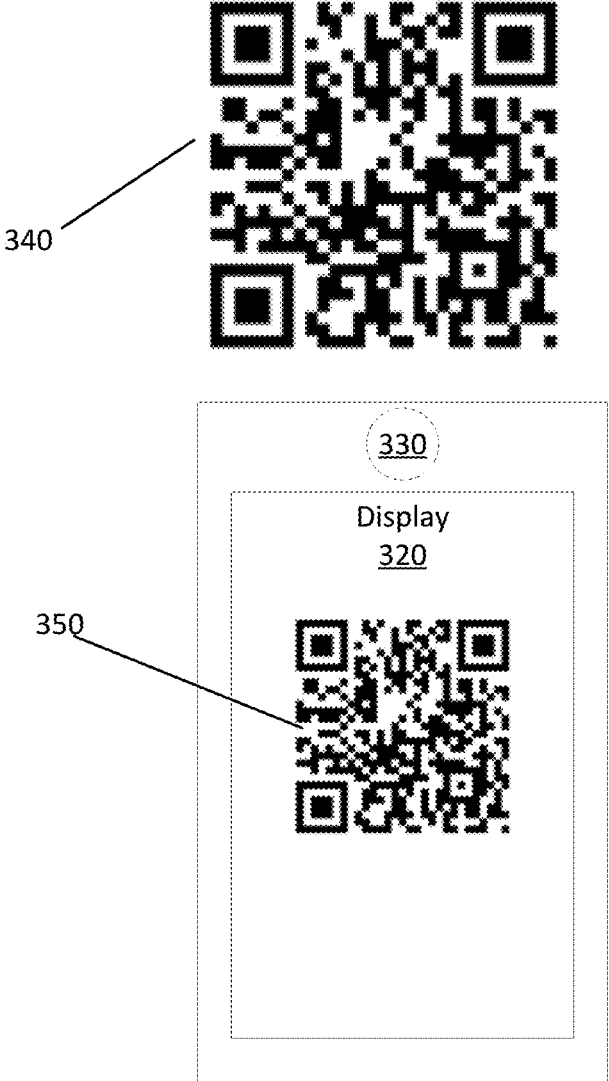
FIG. 3 illustrates a user device that acquires an image of a Quick Response (QR) code when configuring a wireless mesh network.

FIG. 3 illustrates a user device that acquires an image of a Quick Response (QR) code when configuring a wireless mesh network. FIG. 3 includes user device 310 that acquires an image of QR code 340 using camera/sensor 330 at user device 310. User device 310 also includes display 320 that may display an image 350 of QR code 340 or other associated data after the corresponding data has been acquired. The QR code 340 illustrated in FIG. 3 may be a code imprinted on enclosure of a wireless access point (mesh node) or QR code 340 may be imprinted on a box that contained the wireless access point (mesh node).

Once the code is acquired, user device 310 may communicate with the wireless access point when a wireless mesh network is setup, provisioned, or configured. A program application (like mobile application 200 of FIG. 2) executing at user device 310 may allow user device 310 to identify a serial number and authentication code associated with the wireless access point when sending communications to that wireless access point as illustrated in communications 218, 221, 224, 227, 230, and 233 of FIG. 2. These communications may use a low power communication interface that can only transmit signals within a limited range.

Once data corresponding to the QR code is processed by user device 310, user device 310 may perform steps consistent with FIG. 2 when setting up a wireless mesh network. Information transmitted by another type of wireless communication interface may be used to send information directly from user device 310 or via the wireless access point when registration details are sent to a computer in the cloud or Internet. These registration details may be used to associate a customer identifier with devices in a configured wireless mesh network. Furthermore, these registration details may be used to identify that user device 310 is authorized to access the wireless mesh network of that customer, even when user device 310 previously did not communicate with particular devices of a wireless mesh network.

For example, user device 310 may have been used to configure mesh nodes at an office in San Francisco that is associated with customer A. In an instance, where a user of user device 310 travels to an office of customer A in Los Angeles, user device 310 may be identified as being authorized to access the wireless 802.11 network of customer A at their Los Angeles office. Alternatively or additionally, user device 310 could access other devices at the wireless mesh network via a cellular communication interface, when user device 310 was located away from either the San Francisco or the Los Angeles office of customer A.

Instances when multiple wireless mesh nodes are registered or configured, QR codes from multiple different mesh nodes may be scanned by a mobile device. In such instances, each of a set of QR codes may be scanned by a mobile device as processes consistent with the present disclosure are performed. Each QR code for each respective mesh node may be unique or may include unique information. For example, each QR code may include information that identifies serial numbers and authentication codes that are unique to each respective mesh node that are added to a mesh network.

During installation of a new wireless mesh network or when expanding a wireless mesh network, nearby compatible wireless mesh devices may be identified along with respective capabilities of each respective wireless mesh device. A user may be able to select from a list of mesh devices identified using low power data communications when the mesh network is setup or expanded and each of the selected mesh devices may be configured according to a profile in a parallel rather than in a serial manner.

The scanning capability illustrated in respect to FIG. 3 may be used to identify mesh devices that should be configured as part of a mesh network or that are added to a mesh network. A user may also select a size of the mesh network and may set a topology of the mesh network. For example, particular mesh points may be initially configured to communicate with certain other specific mesh points, where each mesh node may be placed in a hierarchy that specifies at least initial settings relating to which mesh point is located how many hops from a particular mesh portal. These mesh points may also be configured to switch configurations based on other settings or parameters by using a program application, such mobile application 200 of FIG. 2. In instances where a user does enter settings related to the configuration of a wireless mesh network, that user may not be required to manually enter device information, such as device serial numbers or machine identifiers because all a user may have to do is to scan a quick response (QR) code to identify a wireless device that will be included in a wireless mesh network.

The onboarding of wireless devices in a wireless mesh network may include the registration of computing devices automatically with little or no user intervention. A user may not be required to manually enter device information as here again a user may simply scan a QR code that identifies a wireless mesh device. This QR code may also include an authorization code and other information that may be used during a registration or onboarding process. Registration or onboarding processes consistent with the present disclosure may include the storing of information that identifies a mesh portal, one or more mesh points, and wireless computing devices associated with a new wireless mesh network. Part of this onboarding process may include a server updating configurations at one or mesh devices according to a profile stored in memory.

Figure 4:
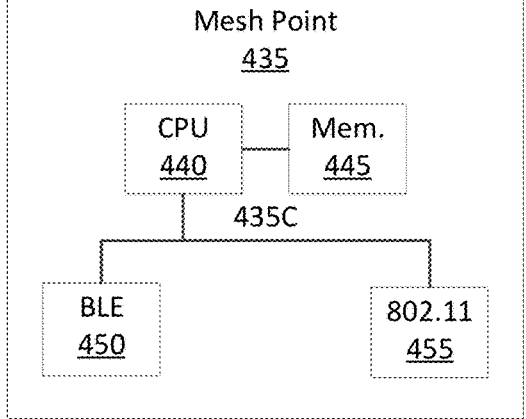
FIG. 4 illustrates different computing devices that may be configured to send communications with each other according to rules or policies consistent with the present disclosure when a wireless mesh network is setup.
Figure 4:
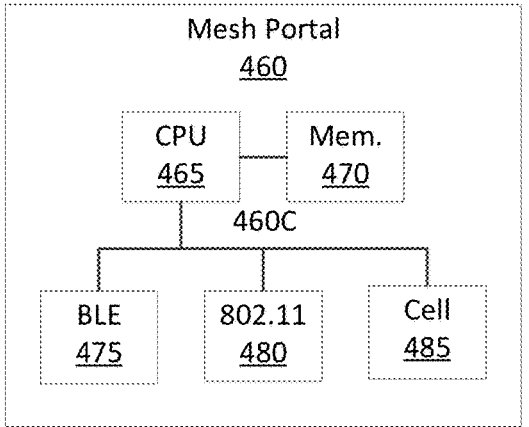
Figure 4:
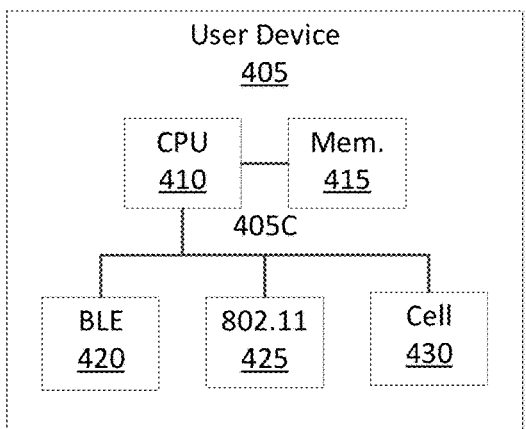

FIG. 4 illustrates different computing devices that may be configured to send communications with each other according to rules or policies consistent with the present disclosure when a wireless mesh network is setup. FIG. 4 includes user device 405, mesh point 435, and mesh portal 460. User device 405 includes a processor/central processing unit (CPU) 410 that may execute instructions out of memory 415. User device 405 also includes communication interfaces of low power Bluetooth® interface 420, Wi-Fi® 802.11 interface 425, and cellular interface 430.

User device 405 may be the same mobile device that executes instructions consistent with functions associated with mobile application 200 of FIG. 2. As such, user device 405 may communicate with low power data communication links (475/450) at mesh portal 435 or mesh portal 460 using BLE links 203 of FIG. 2. User device 405 may communicate with both mesh point 435 and mesh portal 460 using low power data communications after user device 405 scans respective QR or other codes of each of these respective mesh nodes 435 and 460, where each of the respective codes may include an identifier and an authorization code that are respectively unique to mesh point 435 and mesh portal 460.

The mesh point 435 of FIG. 4 includes processor/CPU 440 that may execute instructions out of memory 445. Mesh point 435 also includes Bluetooth® interface 450 and Wi-Fi® 801.22 interface 455. Mesh point 435 may implement functions consistent with the various mesh points (140C, 140D, 150C, or 150D) discussed in respect to FIG. 1. Furthermore, the low power communication link 450 at mesh point 435 may communicate in a manner consistent with the BLE link 203 of FIG. 2. These Bluetooth® communications may be in parallel, may be interleaved, or may be sequential communications.

Mesh portal 460 includes processor/CPU 465 that may execute instructions out of memory 470. Mesh portal 460 also includes communication interfaces of low power Bluetooth® interface 475, Wi-Fi® 802.11 interface 480, and cellular interface 485. Note that mesh portal 460 includes cellular communication interface 485, where mesh point 435 does not include a cellular communication interface. Mesh portal 460 may implement functions consistent with the various mesh portals (140BC or 150B) discussed in respect to FIG. 1. Furthermore, the low power communication link 475 at mesh portal 460 may communicate in a manner consistent with the BLE link 203 of FIG. 2.

Note that mesh portals and mesh points may include different capabilities as mesh portals may include functionality that allows the mesh portal to send network communications over cellular communication interface 485, where mesh point 435 may not include this functionality. In certain instances, mesh portals may include wired network interfaces that allow a mesh portal, like mesh portal 460 to send network communications over a wired computer network, where mesh point 435 may not include such functionality.

Alternatively, mesh point 435 may include a cellular communication interface or a wired that is disabled based on a mesh point configuration that is different from a mesh portal configuration. User device 405 may communicate with both mesh point 435 and with mesh portal 460 using a low power signals that have a limited range. For example, Bluetooth® interface 420 at mobile device 405 may communicate with mesh point 435 using Bluetooth® interface 450 and may communication with mesh point 460 via Bluetooth® interface 475 during a registration process. User device 405 may also communicate with mesh point 435 using 802.11 interface 425 at user device 405 and 802.11 interface 455 at mesh point 435. Alternatively or additionally, user device 405 may also communicate with mesh portal 460 using 802.11 interface 425 at user device 405 and 802.11 interface 480 at mesh portal 460.

In an instance where mesh point 435 fails, communications could "fail over" (switch) to mesh portal 460 or another mesh point (not illustrated in FIG. 4). Such a "fail over" process could include user device 405 forming a communication connection with either mesh portal 460 or with the other mesh point. Communications sent to a computer through a first mesh point may be switched to a second mesh point according to a set of rules that identify conditions when such communications should be switched. For example, a rule may identify that communications be switched to another mesh point when communications with a currently used mesh point is experiencing an error rate that meets or exceeds a threshold level.

Alternatively or additionally, switching rules may identify that a communication connection should be switched when a collision rate increases, when a particular mesh point has a greater than a threshold level measure of congestion, or such rules may dictate that a particular connection should be switched when another mesh node has a greater signal strength. In one example, a reduction in signal strength in communications associated with mesh point 435 may cause a communication connection to switch to another mesh point when that other mesh point has a stronger signal than mesh point 435.

Exemplary measures of congestion include, yet are not limited to an amount of time or average time required to send or receive communication packets, a number of devices connected to a particular mesh point, a number of communications or bytes being transmitted per unit time via particular mesh nodes, or a number of hops to a mesh portal. This number of hops may be associated with a number of mesh points through which a data packet passes until that data packet reaches a mesh portal. The switching capability included in wireless mesh networks consistent with the present disclosure allows either indoor or outdoor wireless networks to self-heal in a manner that is redundant, robust, and secure. This switching capability also allows traffic in a wireless mesh network to be re-configured according to any rules or policies as requirements change over time.

Embodiments of the invention may include instances of promoting a mesh point to assume functions of a mesh portal. This may occur when a particular mesh portal fails, when a greater than a threshold error rate is encountered, when an increased collision rate associated is observed, or when a measure of congestion associated with a mesh portal reaches a threshold level. The promotion of a mesh point to a mesh portal may include enabling functionality at a particular mesh point. In an instance when mesh point 435 is promoted, a cellular communication interface at mesh point 435 may be turned on (enabled) such that mesh point 435 could assume duties previously performed by mesh portal 460.

FIG. 5 illustrates components that may be included in a management system residing in the cloud or Internet that may provide information necessary to setup a wireless mesh network. The cloud management system 510 of FIG. 5 may implement functions consistent with the cloud management system 110 of FIG. 1 and may further implement functions consistent with onboarding service 209 of FIG. 2 or the onboarding service 130 of FIG. 1. The cloud management system 510 of FIG. 5 includes processor 520 that may execute instructions out of memory 530. Memory 530 may also store program code associated with management console 540 operations or with functions associated with onboarding service 550. Functions associated with management console 540 and onboarding service 550 may be identical to functions performed respectively by program code instructions of management console 120 and onboarding service 130 of FIG. 1. Management console program code 540 may allow processor 520 to receive and process information from a computer that sets network configurations or that sets network management rules. Program code of onboarding service 550 may allow information relating to a network configuration to be stored in database 560 that cross-references customer information with mesh node device identifying information, and with identifiers that identify computing devices that are authorized to communicate over a particular mesh network.

Cloud management system 510 of FIG. 5 may also include communication bus 580 that allows processor 520 to access data or instructions stored in memory 530 or in database 560. Instructions stored in database 560 may also include program code that may be executed at a mesh portal or mesh point that is consistent with methods and wireless mesh network configurations of the present disclosure. Management console program code 540 may also allow administrators to set policies or preferences relating to a particular mesh network. Management console 540 may also allow an administrator or user to identify, configure, and authorize new computing devices to access a particular mesh network. Note that processor 520 may also use communication bus 580 to send or receive data via communication interface 570. Network interface 570 may be either a communication interface that communicates with user devices using either wired or a wireless data communications. Here again, wired network communications maybe sent over an Ethernet compatible wired interface or these communications may be send over a cellular or wireless (WIFI) network.

Processor 520 may execute instructions out of memory 530 when operations consistent with management console 540 are performed, when information is stored in database 560, when operations consistent with onboarding service 550 are performed, or when communications are transmitted/received via network interface 570. Operations consistent with onboarding service 550 may include the same sorts of operations discussed in respect to onboarding service 209 of FIG. 2. For example, onboarding service 550 may use/receive login or device information over a secure channel (e.g. HTTPS), may use/provide unique session keys, and may perform device/mesh node registration & license checks consistent with operations associated with communications 218, 221, 257, 260, and 263 of FIG. 2.

FIG. 6 illustrates a method for establishing secure transmission paths in a mesh network. The method of FIG. 6 begins with step 610. A secure communication session is established with a computer that stores information that registers mesh nodes as being part of a wireless mesh network. This secure communication session is setup using a secure communication channel between a computing device and a registration computer, whereby a computing device may send message 212 of FIG. 2. The computing device (such as user device 405 of FIG. 4) may establish the secure communication session via a cellular communication link or other communication link.

When the secure communication connection is established, the computing device may provide information that can be used to help validate the user device or that may help validate a user of the user device. The information provided by the computing device may include one or more of a login request, a user identifier (ID), a password, or a security key. The secure connection established in step 610 may send information through a secure socket layer (SSL) session or a secure hypertext transfer protocol (HTTPS) tunnel.

Step 620 of FIG. 6 illustrates the computing device communicating with a wireless mesh node via a second type of communication interface and corresponding medium. This second type of communication interface may be a low power data Bluetooth® type of communication interface as discussed with respect to FIG. 2. Alternatively, the interface may be an optical communication interface or an interface that uses short distance millimeter radio transducers. These low power communications between the computing device and the wireless mesh node may be performed after the computing device scans a code such as the QR or other codes discussed in respect to FIGS. 2 & 3. Communications 224, 227, 230 and 233 of FIG. 2 may be performed using the aforementioned exemplary low power communication interfaces and corresponding mediums.

In step 630 of FIG. 6, a validation code may be sent to and received by the computing device over a communication channel different than the first type of communication interface; for example, a cellular link communication via the HTTPS protocol or a differing low power medium. The communication received in step 630 is a form of back-channel two-factor authentication that may be sent in an email to an email address, a text message sent to the computing device, or an audio message received by way of a phone call. Though the secure communication session may be established using a cellular network link and email, text messages, or phone calls may be received using communications over a same cellular network, the back-channel two-factor (email, text, or phone call) authentications differ from the secure communication session established over the cellular network. The communications over the secure communication session and the back-channel are ultimately both secure because of the use of a secure protocol such as HTTPS (that was discussed in respect to FIG. 2) and the email/text/phone call are random thereby preventing a would-be hacker from knowing the type of back-channel communication channel that will be o was used to receive a validation code sent by a registration computer.

Alternatively or additionally, back-channel two-factor communications may be secured by sending communications via a communication back-channel that would be unknown to potential attackers without using or without requiring the use of a secure protocol such as HTTPS for the communications sent via the back-channel. In such instances, the fact that potential hackers do not know what type of back-channel communications are used between devices would in itself secure data included in communications. This is because the type of back channel used between devices may be a shared secret only known by those devices.

Two-factor authentication processes consistent with the present disclosure may require the computing device to send information to the registration computer in order to identify alternative communication channels that may be used to communicate with the user device 405 of FIG. 4. These alternative communication channels may be identified in communications sent over the secure communication connection. Alternate communication channels may be identified using a phone number or an email address, for example. While such two-factor authentication processes may be preferred, methods consistent with the present disclosure may use other validation processes that use more than two communication channels, connections, or mediums (e.g. computer network HTTPS connection, a cellular medium, and an email communication connection). These back-channel two-factor communications may also be secured by login information or may be secured by the fact that a hacker may not have access to the computing device at which a text message or phone call is received.

After the computing device receives the validation code from the registration computer via the back-channel communication in step 630, the validation code may be sent to the registration computer via the secure communication session established via the first type of interface in step 640 of FIG. 6. When the registration computer securely receives the validation code via the first type of network interface, the registration computer may compare the receive validation code with the stored validation code.

After the computing device has been validated based on the matching validation codes, the computing device may send registration information to the registration computer in step 650. The registration computer may accept this registration information as being authentic registration information based on the validation of the computing device that used communications communicated via the first type of communication interface and the communications communicated via the back-channel. The registration information sent to the registration computer may include mesh node identifying information and authorization codes discussed in respect to FIG. 2. Registration computer may then store this registration information in a database and this registration information may be uniquely associated with a particular customer or customer identifier. Registration information stored by registration computer may cross-reference customer identifying information with specific mesh node information. This stored information may also identify that the mesh network of the particular customer can be accessed or updated by the computing device that sent the registration information in step 650 of FIG. 6.

After step 650, the computing device may receive a registration complete message from the registration computer in step 660. Such a registration complete message may indicate that the wireless mesh node has successfully been added to a wireless mesh network or may indicate that a new wireless mesh network has been successfully registered to operate. The steps of FIG. 6 may be implemented by a processor executing instructions associated with application 200 of FIG. 2. Furthermore, functions of onboarding service 209 of FIG. 2 may be implemented by onboarding service 130 of FIG. 1 or by cloud management system 110 (of FIG. 1) or 510 of FIG. 5. Furthermore, the steps illustrated in FIG. 6 may be performed by user device 405 of FIG. 4.

This process could be designed to operate only with mesh node devices that have been validated as having been manufactured by a particular company (e.g. Sonic Wall Inc.). In such instances, a registration computer or a cloud management system may access a database of information that cross-references serial number information with authorization codes that were assigned to respective devices during a manufacturing process. In an instance when a particular serial number and a respective authorization code do not match information stored in the database, the mesh node that has that particular serial number may not be allowed to join a wireless mesh network. Alternatively, when serial number and authorization information received in step match information stored in the database, the mesh node device with that matching serial number may be allowed to join a wireless mesh network.

While not illustrated in FIG. 6, information identifying that one or more devices are associated with a validated license may be stored in the registration database. The information stored in the database may identify a plurality of devices that are included in a particular wireless mesh network, may identify one or more user devices that can connect to that particular wireless mesh network, or may identify other characteristics of a wireless mesh network. As such, an administrator or a user may be able to access stored information when reviewing information associated with each and every mesh node in a wireless mesh network. By reviewing this information a user may be able to identify where different wireless mesh nodes are located in a wireless mesh network relative to locations where other mesh nodes are located in the wireless mesh network. As such, this information may identify that a first mesh node is a mesh portal and may identify that a second mesh node is a mesh portal that is located 3 wireless hops from the mesh portal.

Information stored at this database may also include profile or configuration information. This profile information may identify mesh nodes that are configured as a mesh portal and mesh nodes that are configured as a mesh point. The profile of a wireless mesh network may also identify type of communication traffic that can be communicated over frequency band at an 802.11 wireless network. For example, a profile may allow a 5 GHz radio band to communicate both mesh-backhaul and client traffic, where a 2.4 GHZ radio band may be configured to only transfer client traffic. After devices are associated with a validated license in step 650 of FIG. 6 a registration complete message may be sent to a user device in step 660 of FIG. 6. Profile information may include any sort of information that identifies rules or software requirements of mesh node in a wireless mesh network. This profile information may identify a maximum number of hops that may be included in a wireless mesh network or include information that identifies a number of mesh points that can communicate with a single wireless mesh portal in a wireless mesh network. Software configurations associated with a profile may identify operating system version information or program applications that should be installed at different mesh nodes in a wireless mesh network. In certain instances, software configurations at a mesh node may include how respective mesh nodes store data relating to previous access requests in cache memories at the wireless mesh nodes. A single set of profile criteria may be used to control the configuration or settings at all mesh nodes in a particular wireless mesh network.

Profile information may also identify preferred methods for identifying which mesh nodes should communicate with other mesh nodes in a wireless mesh network. As such profile information could instruct mesh nodes to communicate with another mesh node based on a measures of relative signal strength, measures of signal to noise ratios, error rates, or based on measures of congestion. Here again exemplary measures of congestion may include, yet are not limited to an amount of time or average time required to send or receive communication packets, a number of devices connected to a particular mesh point, a number of communications or bytes being transmitted per unit time via particular mesh nodes, or a number of hops to a mesh portal.

Once registered particular mesh nodes have been mesh nodes in that wireless mesh network may receive configuration information, settings, or software updates from a computer at the cloud or Internet that securely sends the configuration information, settings, or software updates to the registered mesh nodes. As such, any new mesh node being added to a particular wireless mesh network may be configured in a manner consistent with a profile stored in a database of an onboarding service. In certain instances, this profile information may be stored at a user device that has been used to register a mesh node with the onboarding service.

In an instance when an additional wireless mesh node is added to an existing wireless mesh network, the process may include a user device scanning a code that is associated with the additional wireless mesh node. Here again, a mobile application like to mobile application 200 of FIG. 2 may include establishing a secure communication connection with a server that executes program code consistent with onboarding service 209.

While various flow diagrams provided and described above may show a particular order of operations performed by certain embodiments of the invention, it should be understood that such order is exemplary (e.g., alternative embodiments can perform the operations in a different order, combine certain operations, overlap certain operations, etc.).

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed is:

1. A method of securing transmission paths in a mesh network, the method comprising:
   storing data in a database in memory regarding a wireless mesh network;
   receiving, over a communication network, one or more settings via an interface of an onboarding device,
   generating a custom profile for configuring a new wireless mesh node device to connect to the wireless mesh network, wherein the custom profile includes one or more security policies in accordance with the one or more settings received from the onboarding device; and
   cross-referencing the custom profile to customer information and adding the new wireless mesh node device to the wireless mesh network in accordance with the custom profile and the cross-referenced customer information, wherein electronic packets routed through the new wireless mesh node device are secured in accordance with the one or more security policies associated with the custom profile.

2. The method of claim 1, wherein the one or more security policies limit a number of mesh portals with which the new wireless mesh node device is allowed to communicate.

3. The method of claim 1, wherein the one or more security policies limit the new wireless mesh node device to a location within a number of hops to a mesh portal.

4. The method of claim 1, wherein the one or more security policies specify one or more passcodes or passphrases assigned to the wireless mesh network.

5. The method of claim 1, wherein the one or more security policies specify how identifiers of one or more devices are used within the wireless mesh network.

6. The method of claim 1, wherein the new wireless mesh node device is one of a plurality of new wireless mesh node devices simultaneously added to the wireless mesh network, and wherein each of the plurality of new wireless mesh node devices is configured in accordance with the custom profile.

7. The method of claim 6, wherein the plurality of new wireless mesh node devices communicate in parallel or semi-parallel with the onboarding device using different wireless connections or interleaved communications.

8. The method of claim 1, further comprising: sending a unique session token to the onboarding device, and establishing a secure session with the onboarding device in accordance with the unique session token before adding the new wireless mesh node device to the wireless mesh network.

9. The method of claim 1, further comprising: receiving a code associated with information regarding the new wireless mesh node device via the onboarding device.

10. A system of securing transmission paths in a mesh network, the system comprising:
   memory that stores data in a database regarding a wireless mesh network;
   a communication interface that communicates over a communication network with an onboarding device to receive one or more settings entered via an interface of the onboarding device; and
   a processor that executes instructions stored in memory, wherein the processor executes the instructions to:
   generate a custom profile for configuring a new wireless mesh node device to connect to the wireless mesh network, wherein the custom profile includes one or more security policies in accordance with the one or more settings received from the onboarding device; and
   cross-reference the custom profile to customer information and add the new wireless mesh node device to the wireless mesh network in accordance with the custom profile and the cross-referenced customer information, wherein electronic packets routed through the new wireless mesh node device are secured in accordance with the one or more security policies associated with the custom profile.

11. The system of claim 10, wherein the one or more security policies limit a number of mesh portals with which the new wireless mesh node device is allowed to communicate.

12. The system of claim 10, wherein the one or more security policies limit the new wireless mesh node device to a location within a number of hops to a mesh portal.

13. The system of claim 10, wherein the one or more security policies specify one or more passcodes or passphrases assigned to the wireless mesh network.

14. The system of claim 10, wherein the one or more security policies specify how identifiers of one or more devices are used within the wireless mesh network.

15. The system of claim 10, wherein the new wireless mesh node device is one of a plurality of new wireless mesh node devices simultaneously added to the wireless mesh network, and wherein each of the plurality of new wireless mesh node devices is configured in accordance with the custom profile.

16. The system of claim 15, wherein the plurality of new wireless mesh node devices communicate in parallel or semi-parallel with the onboarding device using different wireless connections or interleaved communications.

17. The system of claim 10, wherein the communication interface further sends a unique session token to the onboarding device, and establishes a secure session with the onboarding device in accordance with the unique session token before adding the new wireless mesh node device to the wireless mesh network.

18. The system of claim 10, wherein the communication interface further receives a code associated with information regarding the new wireless mesh node device via the onboarding device.

19. A non-transitory computer-readable storage medium having embodied thereon a program executable by a processor to perform a method of securing transmission paths in a mesh network, the method comprising:

storing data in a database in memory regarding a wireless mesh network;

receiving, over a communication network, one or more settings via an interface of an onboarding device;

generating a custom profile for configuring a new wireless mesh node device to connect to the wireless mesh network, wherein the custom profile includes one or more security policies in accordance with the one or more settings received from the onboarding device; and cross-referencing the custom profile to customer information and adding the new wireless mesh node device to the wireless mesh network in accordance with the custom profile and the cross-referenced customer information, wherein electronic packets routed through the new wireless mesh node device are secured in accordance with the one or more security policies associated with the custom profile.

20. The non-transitory computer-readable storage medium of claim 19, wherein the new wireless mesh node device is one of a plurality of new wireless mesh node devices simultaneously added to the wireless mesh network, and wherein each of the plurality of new wireless mesh node devices is configured in accordance with the custom profile, and wherein the plurality of new wireless mesh node devices communicate in parallel or semi-parallel with the onboarding device using different wireless connections or interleaved communications.

* * * * *